(12) United States Patent
King et al.

(10) Patent No.: US 11,113,056 B2
(45) Date of Patent: Sep. 7, 2021

(54) TECHNIQUES FOR PERFORMING STORE-TO-LOAD FORWARDING

(71) Applicant: Advanced Micro Devices, Inc., Santa Clara, CA (US)

(72) Inventors: John M. King, Austin, TX (US); Matthew T. Sobel, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/698,808

(22) Filed: Nov. 27, 2019

(65) Prior Publication Data

US 2021/0157590 A1 May 27, 2021

(51) Int. Cl.
*G06F 9/38* (2018.01)
*G06F 9/30* (2018.01)
*G06F 9/54* (2006.01)
*G06F 12/0811* (2016.01)

(52) U.S. Cl.
CPC ...... *G06F 9/30043* (2013.01); *G06F 9/30021* (2013.01); *G06F 9/3836* (2013.01); *G06F 9/3838* (2013.01); *G06F 9/544* (2013.01); *G06F 12/0811* (2013.01)

(58) Field of Classification Search
None
See application file for complete search history.

(56) References Cited

U.S. PATENT DOCUMENTS

| 5,606,683 | A | * | 2/1997 | Riordan | G06F 12/1027 711/203 |
| 5,664,215 | A | * | 9/1997 | Burgess | G06F 9/30043 712/23 |
| 5,761,740 | A | * | 6/1998 | Johnson | G06F 9/30047 711/113 |
| 5,895,503 | A | * | 4/1999 | Belgard | G06F 12/1036 711/202 |
| 6,021,485 | A | * | 2/2000 | Feiste | G06F 9/3834 712/216 |

(Continued)

FOREIGN PATENT DOCUMENTS

| EP | 0686912 A2 * | 12/1995 | ........... G06F 9/3816 |
| EP | 0871109 A2 * | 10/1998 | ........... G06F 9/3834 |
| WO | WO-0150252 A1 * | 7/2001 | ........... G06F 9/3826 |

OTHER PUBLICATIONS

'Store-to-Leak Forwarding: Leaking Data on Meltdown-resistant CPUs' by Michael Schwarz et al., May 14, 2019. (Year: 2019).*

(Continued)

*Primary Examiner* — Steven G Snyder
(74) *Attorney, Agent, or Firm* — Volpe Koenig

(57) ABSTRACT

A technique for performing store-to-load forwarding is provided. The technique includes determining a virtual address for data to be loaded for the load instruction, identifying a matching store instruction from one or more store instruction memories by comparing a virtual-address-based comparison value for the load instruction to one or more virtual-address-based comparison values of one or more store instructions, determining a physical address for the load instruction, and validating the load instruction based on a comparison between the physical address of the load instruction and a physical address of the matching store instruction.

20 Claims, 5 Drawing Sheets

(56) References Cited

U.S. PATENT DOCUMENTS

| | | | | |
|---|---|---|---|---|
| 6,463,523 | B1* | 10/2002 | Kessler | G06F 9/3814 712/202 |
| 6,481,251 | B1* | 11/2002 | Meier | G06F 9/3834 70/52 |
| 6,523,109 | B1* | 2/2003 | Meier | G06F 9/30043 711/123 |
| 6,813,699 | B1* | 11/2004 | Belgard | G06F 12/1036 711/203 |
| 7,065,632 | B1* | 6/2006 | Col | G06F 9/3834 712/218 |
| 7,603,527 | B2* | 10/2009 | Hily | G06F 9/3824 711/158 |
| 8,533,438 | B2* | 9/2013 | Hooker | G06F 9/384 712/225 |
| 9,361,227 | B2* | 6/2016 | Avudaiyappan | G06F 9/3824 |
| 9,471,504 | B2* | 10/2016 | Alexander | G06F 9/30043 |
| 9,767,020 | B2* | 9/2017 | Avudaiyappan | G06F 12/08 |
| 10,402,322 | B2* | 9/2019 | Avudaiyappan | G06F 12/1045 |
| 2002/0141426 | A1* | 10/2002 | Tanaka | G06F 9/3834 370/412 |
| 2004/0044881 | A1* | 3/2004 | Maier | G06F 9/3834 712/218 |
| 2005/0010744 | A1* | 1/2005 | Filippo | G06F 9/3834 712/225 |
| 2007/0288725 | A1* | 12/2007 | Luick | G06F 9/3834 712/225 |
| 2008/0082765 | A1* | 4/2008 | Hily | G06F 9/3824 711/154 |
| 2009/0138659 | A1* | 5/2009 | Lauterbach | G06F 9/3857 711/119 |
| 2011/0040955 | A1* | 2/2011 | Hooker | G06F 9/3861 712/225 |
| 2014/0281116 | A1 | 9/2014 | Abdallah et al. | |
| 2015/0067230 | A1* | 3/2015 | Avudaiyappan | G06F 9/3826 711/3 |
| 2015/0067305 | A1* | 3/2015 | Olson | G06F 9/3834 712/225 |
| 2015/0121046 | A1 | 4/2015 | Kunjan et al. | |
| 2015/0234664 | A1 | 8/2015 | Kim et al. | |
| 2015/0339238 | A1* | 11/2015 | Avudaiyappan | G06F 12/10 711/137 |
| 2017/0192894 | A1 | 7/2017 | Yu et al. | |
| 2018/0046575 | A1* | 2/2018 | Avudaiyappan | G06F 9/3834 |
| 2019/0004810 | A1 | 1/2019 | Jayashima et al. | |

OTHER PUBLICATIONS

'Store-to-Load Forwarding and Memory Disambiguation in x86 Processors' by Henry, On Jan. 9, 2014. (Year: 2014).*

'Address-Indexed Memory Disambiguation and Store-to-Load Forwarding' by Sam S. Stone et al., from Proceedings, 38th International Symposium on Microarchitecture, Nov. 2005. (Year: 2005).*

Sethumadhavan, S., et. al., "Late-Binding: Enabling Unordered Load-Store Queues", 11 pgs., 2007, (downloaded from: https://people.csail.mit.edu/emer/papers/2007.06.isca.late_binding.pdf).

Stone, S. S., et. al., "Address-Indexed Memory Disambiguation and Store-to-Load Forwarding", IEEE, 12 pgs., Nov. 2005, (downloaded from: http://citeseerx.ist.psu.edu/viewdoc/download?doi=10.1.1.79.6693&rep=rep1&type=pdf).

Cain, H. W., & Lipasti, M. H., "Memory Ordering: A Value-Based Approach", 12 pgs., 2004, (downloaded from: http://pharm.ece.wisc.edu/papers/isca2004cain.ps).

Gharachorloo, K., et. al., "Two Techniques to Enhance the Performance of Memory Consistency Models", 10 pgs., 1991, (downloaded from: http://citeseerx.ist.psu.edu/viewdoc/download?doi=10.1.1.89.3693&rep=rep1&type=pdf).

Roth, A., "Store Vulnerability Window (SVW): Re-execution Filtering for Enhanced Load Optimization", IEEE, 13 pgs., Jun. 2005, (downloaded from: http://repository.upenn.edu/cgi/viewcontent.cgi?article=1228&context=cis_papers).

* cited by examiner

TECHNIQUES FOR PERFORMING STORE-TO-LOAD FORWARDING

BACKGROUND

Out of order processors execute instructions out of order but obey certain constraints in order to ensure that execution occurs as specified by the program. In particular, younger loads that are performed to the same address as older stores are sometimes executed out of order and close together in time. If the value stored by the store instruction has not yet been committed to the memory system (which includes, for example, a cache that is backed by higher level caches and system memory) by the time that the load instruction executes, then store-to-load forwarding is performed, in which the instruction pipeline provides the data stored by the store instruction directly to the load instruction.

BRIEF DESCRIPTION OF THE DRAWINGS

A more detailed understanding may be had from the following description, given by way of example in conjunction with the accompanying drawings wherein.

DETAILED DESCRIPTION

A technique for performing store-to-load forwarding is provided. The technique includes determining a virtual address for data to be loaded for the load instruction, identifying a matching store instruction from one or more store instruction memories by comparing a virtual-address-based comparison value for the load instruction to one or more virtual-address-based comparison values of one or more store instructions, determining a physical address for the load instruction, and validating the load instruction based on a comparison between the physical address of the load instruction and a physical address of the matching store instruction. A processing unit and load/store subsystem are also provided.

Figure 1:
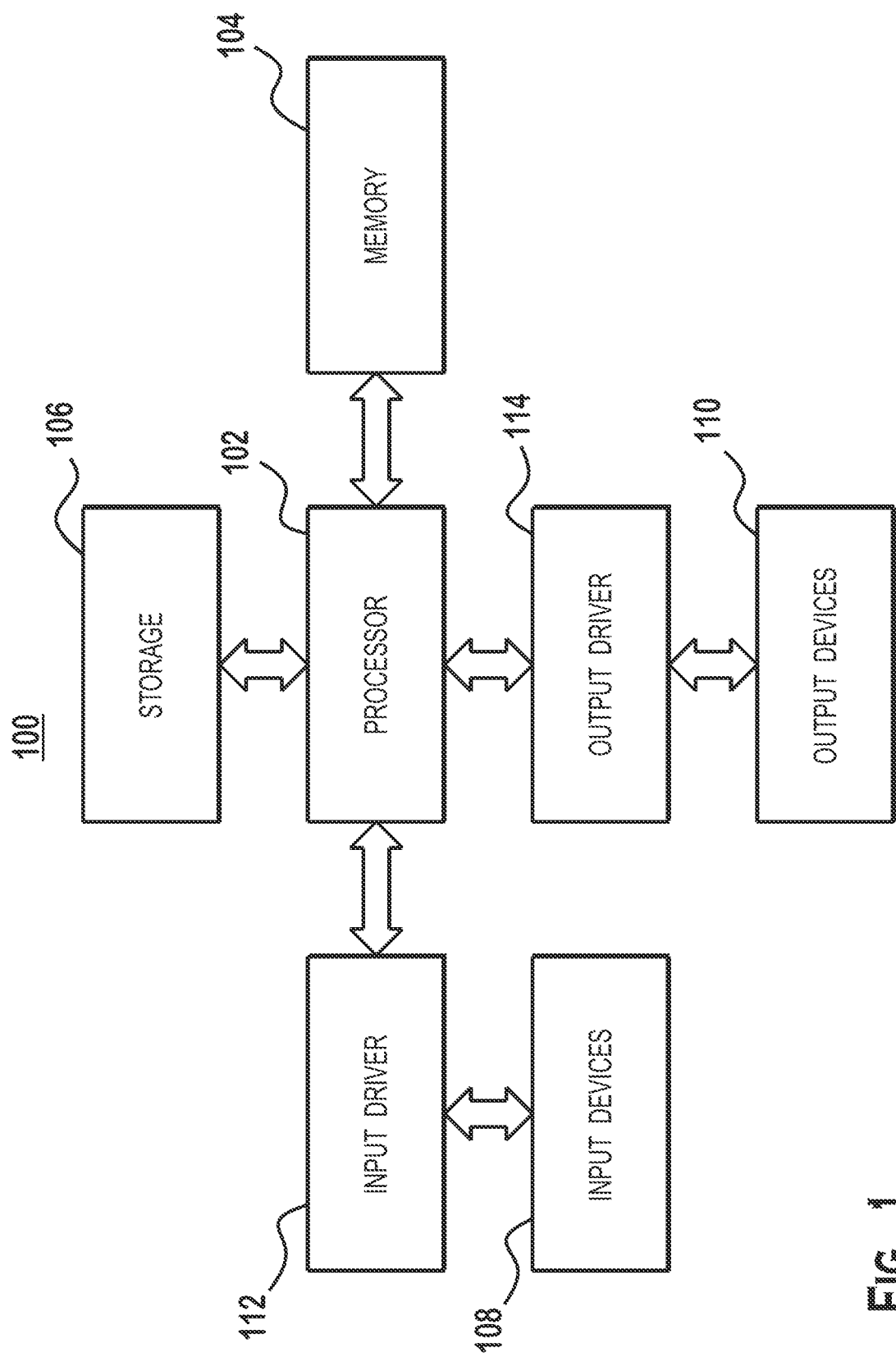
FIG. 1 is a block diagram of an example device in which aspects of the present disclosure are implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 also optionally includes an input driver 112 and an output driver 114. In some implementations, the device 100 includes additional components not shown in FIG. 1.

In some examples, the processor 102 includes a central processing unit (CPU), a graphics processing unit (GPU), a CPU and GPU located on the same die, or one or more processor cores, wherein each processor core is a CPU or a GPU. In various examples, the memory 104 is located on the same die as the processor 102, or is located separately from the processor 102. The memory 104 includes a volatile or non-volatile memory, for example, random access memory (RAM), dynamic RAM, or a cache.

The storage device 106 includes, in various examples, and without limitation, a fixed or removable storage, for example, a hard disk drive, a solid state drive, an optical disk, or a flash drive. The input devices 108 include, in various examples, and without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, in various examples, and without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
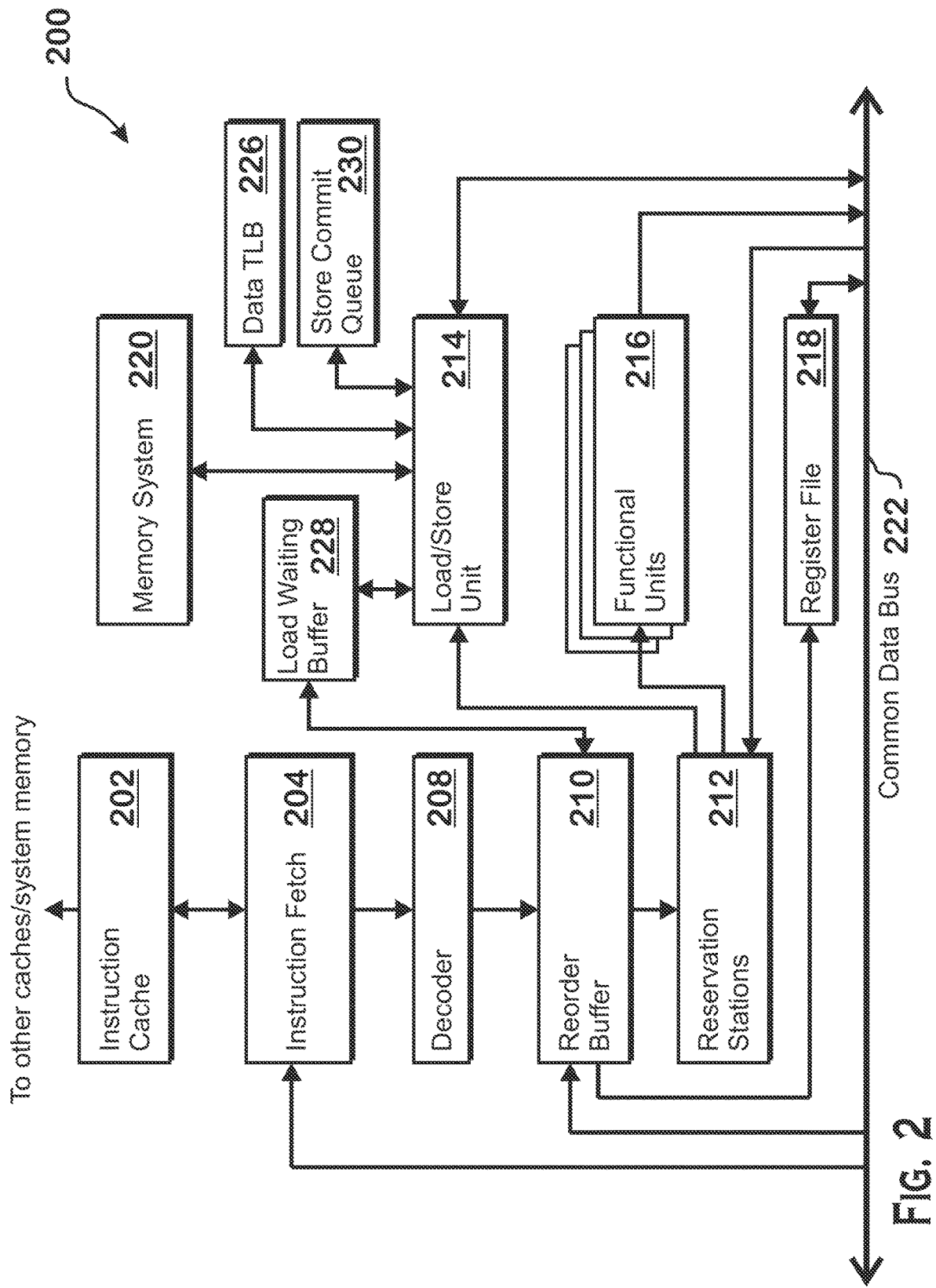
FIG. 2 is a block diagram of an instruction execution pipeline, located within the processor of FIG. 1, according to an example.

FIG. 2 is a block diagram of an instruction execution pipeline 200, located within the processor 102 of FIG. 1, according to an example. The instruction execution pipeline 200 retrieves instructions from memory and executes the instructions, outputting data to memory and modifying the state of elements within the instruction execution pipeline 200, such as registers within register file 218.

The instruction execution pipeline 200 includes an instruction fetch unit 204 that fetches instructions from system memory (such as memory 104) via an instruction cache 202, a decoder 208 that decodes fetched instructions, functional units 216 that perform calculations to process the instructions, a load/store unit 214 that loads data from or store data to system memory via a memory system 220, and a register file 218, which includes registers that store working data for the instructions. The memory system 220 includes one or more memories of a memory hierarchy, including, for example, a data cache (e.g., level 0), other caches, memories, and other memories. A reorder buffer 210 tracks instructions that are currently in-flight and ensures in-order retirement of instructions despite allowing out-of-order execution while in-flight. "In-flight" instructions refers to instructions that have been received by the reorder buffer 210 but have not yet had results committed to the architectural state of the processor (e.g., non-speculative results written to a register file, or the like). Reservation stations 212 maintain instructions waiting to be executed on the functional units 216 and track instruction operands. When all operands are ready for execution of a particular instruction, reservation stations 212 send the instruction to a functional unit 216 or a load/store unit 214 for execution. Completed instructions are marked for retirement in the reorder buffer 210 and are retired when at the head of the reorder buffer queue 210. Retirement refers to the act of committing results of an instruction to the architectural state of the processor. For example, writing an addition result to the youngest, non-speculative copy of the architectural register, by an add instruction, writing a loaded value to the youngest, non-speculative copy of an architectural register by a load instruction, or non-speculatively causing instruction flow to jump to a new location, by a branch instruction, are all examples of retirement of the instruction.

Various elements of the instruction execution pipeline 200 communicate via a common data bus 222. For example, the functional units 216 and load/store unit 214 write results to the common data bus 222 which may be read by reservation stations 212 for execution of dependent instructions and by the reorder buffer 210 as the final processing result of an in-flight instruction that has finished execution. The load/store unit 214 also reads data from the common data bus 222. For example, the load/store unit 214 reads results from completed instructions from the common data bus 222 and writes the results to memory via the memory system 220 for store instructions.

The instruction execution pipeline 200 is capable of executing load instructions and store instructions (among other instructions). Load instructions are instructions that load data from memory and place that data into a register in the register file 218. Store instructions are instructions that store data from a register to a memory location. For either stores or loads, in many situations, the specified address (the address to which data is stored or from which data is loaded) is calculated based on the contents of one or more registers and/or one or more values specified in the instruction itself. Further, for loads or stores that specify virtual memory addresses, those addresses are translated into physical addresses.

In greater detail, a store instruction is executed as follows. The instruction fetch unit 204 fetches a store instruction. The decoder 208 decodes the store instruction and transmits the store instruction to the reorder buffer 210, which provides the store instruction to the load/store unit 214. The reservation stations 212 issues the store instruction to the functional units 216 to generate a virtual address (e.g., calculating the virtual address in the manner specified by the store instruction—for example, by adding the contents of one register to the contents of another register). Subsequently, the functional units 216 transmit the virtual address to the load/store unit 214, which executes the store instruction. The load/store unit 214 executes the store instruction by translating the virtual address to a physical address via the data translation lookaside buffer (TLB) 226 and by buffering the data to be stored by the store instruction internally in the load/store unit 214. The reorder buffer 210 retires the store instruction, which means that the store instruction is not speculatively executing and will eventually be committed to the memory system 220. The load/store unit 214 transmits the store instruction to the store commit queue 230. The load/store unit 214 then commits the store to the memory system 220, and removes the store instruction from the store commit queue 230 in response to receiving a notification that the data specified by the store instruction has been actually written to the memory system 220. In some implementations, a store commit queue 230 is not used.

In greater detail, a load instruction is executed as follows. The instruction fetch unit 204 fetches a load instruction. The decoder 208 decodes the load instruction and transmits the load instruction to the reorder buffer 210, which provides the load instruction to the load/store unit 214. The reservation stations 212 issue the load instruction to the functional units 216 to generate a virtual address for the load instruction (e.g., calculating the virtual address in the manner specified by the load instruction—for example, by adding the contents of one register to the contents of another register). Subsequently, the functional units 216 transmit the virtual address to the load/store unit 214, which executes the load instruction. The load/store unit 214 executes the load instruction by translating the virtual address to a physical address via the data TLB 226 and by loading the data specified by the physical address from the memory system 220.

For performance reasons, the load/store unit 214 performs store-to-load forwarding for stores and loads that access the same address and are executed in at least partially overlapping time periods. More specifically, in some circumstances, a load instruction and a store instruction occur to the same address, and the load instruction is a younger instruction than the store instruction. The load instruction, executing in the load/store unit 214, attempts to load the requested data. If the store instruction has not yet committed its data to the memory system 220, then reading from the memory system by the load instruction is not possible, as such a read would result in stale data. Thus the load/store unit 214 forwards the data from the store instruction to the load instruction.

As stated above, the store-to-load forwarding occurs if the physical addresses of a load instruction and an older store instruction are the same. Store-to-load forwarding should not occur if the physical addresses are different. Thus in one technique, upon executing the load instruction, the load/store unit 214 checks whether the physical address of the load instruction is the same as any non-committed store instruction. However, this technique results in potential delays associated with the fact that in some circumstances, either or both of the physical addresses of the store instruction or the load instruction are not known at the time that this check is to occur. Thus, this technique would result in a delay for successfully executing a load instruction until such physical addresses are available.

Thus in a technique, the load/store unit 214 checks for a match between a load instruction and a non-committed store instruction using a virtual address-based comparison value (sometimes referred to herein simply as a "comparison value") that is based on the virtual address of the data to be loaded by the load instruction. In some implementations, the virtual address-based comparison value is the full virtual address. In other implementations, the virtual address-based comparison value is a portion of the full virtual address. In yet other implementations, the virtual address-based comparison value is a value derived from the full virtual address through a transformation function (where in some implementations, the transformation function is a hash function). In still other implementations, the virtual address-based comparison value is a value derived from a portion of the virtual address through a transformation function (where in some implementations, the transformation function is a hash function). The virtual address-based comparison value is calculated for both the load instruction and store instructions to allow these values to be compared. In some implementations, a "match" means that the virtual address-based comparison value for the store instruction is identical to the virtual address-based comparison value for the load instruction. In other implementations, a match means that a portion of the comparison values are the same.

Note that the match between a virtual address-based comparison value for a load instruction and a virtual address-based comparison value for a store instruction does not necessarily indicate that the physical addresses of the load instruction and the store instruction are the same. The match for the comparison value is instead an indication that it is likely that these physical addresses are the same. Therefore, execution of the load instruction, including obtaining the data from a store instruction with a matching comparison value, is considered speculative. For this reason, the load/store unit 214 validates that the load executed correctly, some time after retrieving the data based on the comparison value match. The event that triggers this validation of the load instruction is referred to herein as a "validation trigger event." In some examples, the validation trigger event is successful completion of the load instruction, meaning that the load instruction completes all other steps, such as address translation and actually receiving the loaded data, that would lead to the load instruction being considered complete. In other examples, the validation trigger event is successful completion of the store instruction after the load instruction has already completed. If validation completes successfully, then the data loaded by the load instruction is considered correct and the load instruction is considered no longer executing speculatively for the purpose of validating store-to-load forwarding (in some circumstances, the load instruction is still executing speculatively for other reasons). If validation does not complete successfully, then the load instruction is flushed from the instruction execution pipeline 200, meaning that the load instruction (and, in some examples, potentially other instructions such as instructions younger than the load instruction) is removed from the pipeline and the flushed load instruction does not affect the architectural state of the pipeline, and the load instruction (and potentially other instructions) is replayed.

Validation of store-to-load forwarding that occurs based on a virtual address-based comparison value occurs in the following manner. It is possible that at the time of validation, the store instruction has already successfully completed the virtual-to-physical address translation for the address to which data is to be stored. In that event, validation includes checking whether the physical address for the store instruction is the same as the physical address from which the load instruction read the loaded data. The load instruction is successfully validated in the event that the physical addresses are the same and is not validated in the event that the physical addresses are different. Note that this validation occurs at a later point in the execution of the load instruction, to hide the delay in obtaining the physical addresses of both the load and the store instructions.

It is also possible that at the time of validation for the load instruction, the store instruction has not yet successfully completed the virtual-to-physical address translation for the address to which data is to be stored. In that event, in response to the load/store unit 214 completing the load instruction, the load/store unit 214 places the load instruction into a load waiting buffer 228. When the load/store unit 214 obtains the physical address, through address translation, for the store instruction whose comparison value matched the load instruction, the load/store unit 214 compares that physical address to the physical address of the load instruction. In the event that the physical addresses are the same, validation is considered to have completed successfully. In the event that the physical addresses are not the same, validation is considered to not have completed successfully.

In some implementations, the load waiting buffer 228 is an out of order buffer that is also used to validate store to load memory ordering rules. More specifically, store-to-load ordering is a memory ordering rule that requires all loads to receive data from store operations as defined by program order (i.e., the order in which instructions are supposed to be executed in according to the control flow of the software executing those instructions). Store-to-load ordering is enforced between instructions of the same threads, to prevent load instructions from consuming stale data, since the instruction execution pipeline 200 is capable of executing instructions, including load instructions and store instructions, out of order.

In some examples, violations for store-to-load ordering are checked for in the following manner. In response to a load instruction completing, and that load instruction being eligible for placement into the out of order buffer, the load/store unit 214 places the load instruction in the out of order buffer. A load instruction is eligible for placement into the out of order buffer in the situation that there is a possibility for the load instruction to commit a violation of the store-to-load ordering rule. There is a possibility for such violation if there is at least one store instruction older than the load instruction, where the load/store unit 214 has not yet determined the physical address for the older store instruction. If a load instruction is not eligible for placement into the out of order buffer, the load/store unit 214 does not place the load instruction into the out of order buffer.

While in the out of order buffer, the load/store unit 214 checks for violations of the store-to-load ordering rules in the following manner. Upon determining the physical address for a store instruction that is older than the load instruction, the load/store unit 214 compares that physical address to the physical address of the load instruction. If there is a match, then the load/store unit 214 determines that a violation occurs and if there is no match, then the load/store unit 214 determines that a violation does not occur for that store instruction. In response to there being no more store instructions that are older than the load instruction and that have not yet had their physical addresses determined, the load/store unit 214 determines that a violation is no longer possible for the load instruction and removes the load instruction from the out of order buffer, if there is no other reason to retain the load instruction in the out of order buffer.

The load waiting buffer 228 is therefore, in some implementations, used to perform store to load forwarding validation and to perform checks for violations of store-to-load ordering rules. If both checks are needed, then the load/store unit 214 removes the load instruction from the load waiting buffer 228 in response to both checks being complete.

In some implementations, the load/store unit 214 implements a technique involving initial candidate store instruction selection based on a portion of the virtual address of the load instruction, followed by a comparison value based preliminary validation and subsequently a physical address-based final validation. More specifically, in the course of executing a load instruction, the load/store unit 214 selects a candidate non-committed store instruction based on the least significant X number of bits of the virtual address of a store instruction (in some examples, X is 12) and the least significant X number of bits of the virtual address of the load instruction. More specifically, the load/store unit 214 identifies, as the candidate non-committed store instruction, a non-committed store instruction whose least significant X number of bits are identical to those of the load instruction. Then, the load/store unit 214 attempts to preliminarily validate that the store instruction is the correct instruction to obtain data for the load instruction by comparing the virtual address-based comparison value of the store instruction with the virtual address-based comparison value of the load instruction. If there is a match, then the load/store unit 214 allows the load instruction to execute using the data from the match store instruction.

At a later time, the load/store unit 214 performs final validation using the physical addresses of the match store instruction and the load instruction as described elsewhere herein. If, after identifying the candidate non-committed store instruction, the virtual address-based comparison values do not match, then there are two possibilities: a false miss or a true miss. A false miss occurs where the virtual addresses of the candidate non-committed store instruction and the load instruction have the same X least significant bits, where the virtual addresses are themselves different (and thus have different comparison values—for example, hashes of different virtual addresses are different) but nonetheless, the different virtual addresses point to the same physical address. A true miss occurs where the X least significant bits match but the rest of the virtual addresses do not match and the physical addresses also do not match. Therefore, if, after identifying the candidate non-committed store instruction, the virtual address-based comparison values do not match, the load/store unit 214 identifies whether this failure to match indicates a true miss or a false miss by comparing physical addresses as described elsewhere herein (for example, as described with respect to step 408 of FIG. 4).

If the physical addresses are different, then a true miss occurs. If the physical addresses are the same, then a false miss has occurred. In both cases, the load instruction is replayed. If a true miss occurs, then the candidate store instruction does not hold the correct data for the load instruction, and the load instruction does not receive data from that store instruction on subsequent replays. If a false miss occurs, then the candidate store instruction does hold the correct data for the load instruction and the load instruction receives data from the store instruction on subsequent replays.

In some implementations, a false miss is detected after the match with the candidate store instruction has been preliminarily invalidated. More specifically, as described elsewhere herein, preliminary validation, based on virtual address-based comparison values, occurs at a relatively early stage in execution of the load instruction, where physical addresses of either or both of the load instruction and the store instruction are not available. A subsequent final validation occurs when physical addresses are available. In the case of a true miss, the load/store unit 214 remembers that the store instruction was not a match and replays the load instruction. Using this remembered information, the load/store unit 214 excludes the store instruction from initial candidate selection, and the load instruction does not receive data from that store instruction. In the case of a false miss, the load/store unit 214 remembers that the store was a match and replays the load. Using this remembered information, the load/store unit 214 forces the validation that would fail due to a comparison value mismatch to instead succeed. The final validation also succeeds because the physical addresses are identical.

Figure 3A:
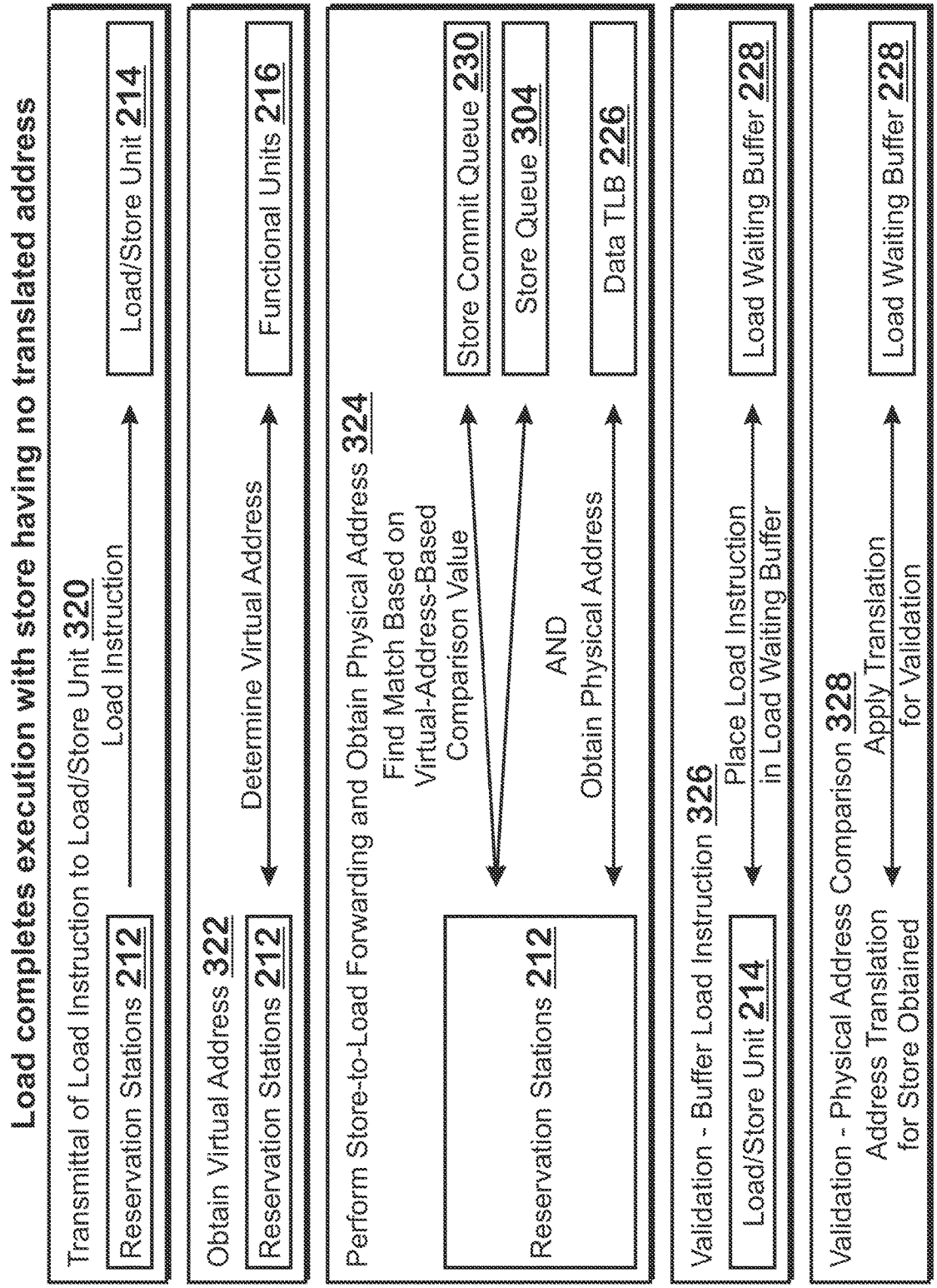
FIG. 3A is a diagram illustrating operations for performing store-to-load forwarding according to an example.

FIG. 3A is a diagram illustrating operations for performing store-to-load forwarding according to an example. In FIG. 3A, a load instruction that loads from an address executes at a time where a store instruction, that writes to the same address, has at least partially executed but has not yet had results committed.

At operation 320, the reservation stations 212, which have received the load instruction from the reorder buffer 210, through the decoder 208 and instruction fetch unit 204, transmits the load instruction to the load/store unit 214 for execution. At operation 322, the reservation stations 212 transmits the load instruction to the functional units 216 to determine the virtual address of the load instruction. Because many load instructions include virtual addresses that are specified indirectly (e.g., as the sum of two or more values such as a base address and an offset), operation 322 involves performing the operations in the functional units 216 to obtain the virtual address from which data is to be loaded as specified by the load instruction.

In operation 324, the load/store unit 214 performs the following sub-operations. The load store unit determines a virtual-address-based comparison value based on the virtual address obtained at operation 322. In various examples, this determination is made by performing a hash on the full or partial virtual address obtained at operation 322 or by performing an operation other than a hash on the full or partial virtual address obtained at operation 322. Finding the match involves finding a store operation that has not yet had results committed to the memory system that has a virtual-address-based comparison value that matches the virtual-address-based comparison value of the load instruction. In some examples, a match between two virtual-address-based comparison values means that the two values are the same. In other examples, a match between two virtual-address-based comparison values means that a portion of the two values are the same. In yet other examples, a match means that a function applied to the two values results in values that are the same. Operation 326 illustrates that a match is searched for in a store queue 304 and a store commit queue 230, but it is possible to alternatively or additionally search other structures that store data for a store instruction that has not yet been committed to memory. The store queue 304 is a memory that stores store instructions that are pending from the time the load/store unit 214 receives the store instruction until the time the store instruction retires and is placed in the store commit queue 230. The store commit queue 230 is a memory that stores a store instruction from the time the store instruction is received from the store queue 304 until the time the data that is stored by the store instruction has been committed (i.e., stored) to the memory system 220.

In addition, at operation 324, the load/store unit 214 provides the address for the load instruction to the address translation system (i.e., the data TLB 226, which attempts to translate the address via the contents of the TLB cache memory and with the assistance of levels higher up in the memory hierarchy if necessary), which returns the translated address. At operation 324, in some circumstances, the match finding and address translation occur in at least partially overlapping time periods. In some circumstances, the load/store unit 214 issues the operations to find the match and the operations to translate the virtual address to a physical address at approximately the same time. In an example, "approximately the same time" means in the same clock cycle. In another example, "approximately the same time" means that both start in response to obtaining the virtual address. In general, at operation 324, each operation begins without waiting for the other to complete.

Note that because finding the match between comparison values starts before waiting for the physical address completes, the load instruction is able to get the loaded data earlier than if the load instruction waited for the physical address to complete. However, because the match that occurs at operation 324 is not based on the physical address, a validation operation—operation 326—occurs to validate the loaded data. In addition, in FIG. 3A, at the point at which validation occurs, the matching store instruction has not yet received a translated address (where the term "matching store instruction" means that store instruction whose virtual-address-based comparison value was found to match the virtual-address-based comparison value of the load instruction at operation 324). More specifically, the process of executing the store instruction, which is older than the load instruction, also involves obtaining an address translation.

However, it is possible for the address translation for the load instruction to be obtained earlier than the address translation for the matching store instruction. In that situation, which, again, is represented in FIG. 3A, at operation 326, the load/store unit 214 places the load instruction into the load waiting buffer 228. At operation 328, in response to the physical address translation being obtained for the store instruction, the load/store unit applies that physical address to the load waiting buffer 228 to validate the speculatively executed load instruction. If the physical address of the load instruction does not match the physical address of the store instruction, then the load/store unit 214 determines that the speculative execution of the load instruction failed, and the load/store unit 214 flushes the load instruction from the instruction execution pipeline 200 and causes the load instruction to replay. If the physical address of the load instruction does match the physical address of the store instruction, then the load/store unit 214 determines that speculative execution completed successfully.

Figure 3B:
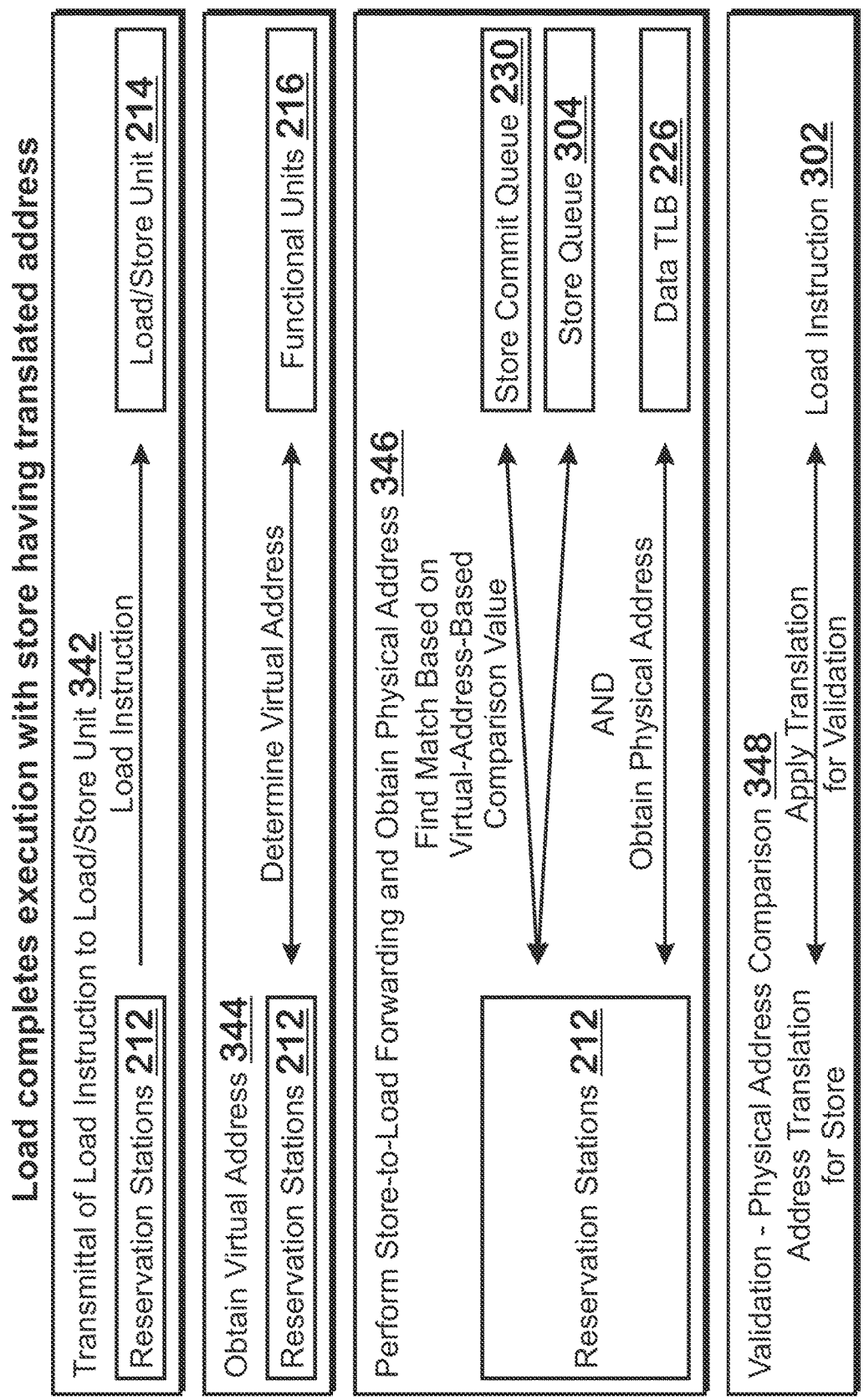
FIG. 3B is a diagram illustrating operations for performing store-to-load forwarding according to another example.

FIG. 3B is a diagram illustrating operations for performing store-to-load forwarding according to another example. This example is similar to the example of FIG. 3A, except that at time of validation of the load instruction, the load instruction is not placed into the load waiting buffer 228 because the physical address for the store instruction is already available. More specifically, at operation 342, the reservation stations 212 dispatch the load instruction to the load/store unit 214 in a similar manner as with respect to operation 322. At operation 344, the reservation stations 212 determine the virtual address for the load instruction in a similar manner as with respect to operation 324. At operation 346, the load/store unit finds a match for the comparison value of the load instruction and a store instruction in a similar manner as with respect to operation 326. At operation 348, the load/store unit 214 compares the physical address of the store instruction with the physical address of the load instruction. If the addresses are the same, then the load instruction is validated. If the addresses are not the same, then the load instruction is not validated and is flushed and replayed.

Figure 4:
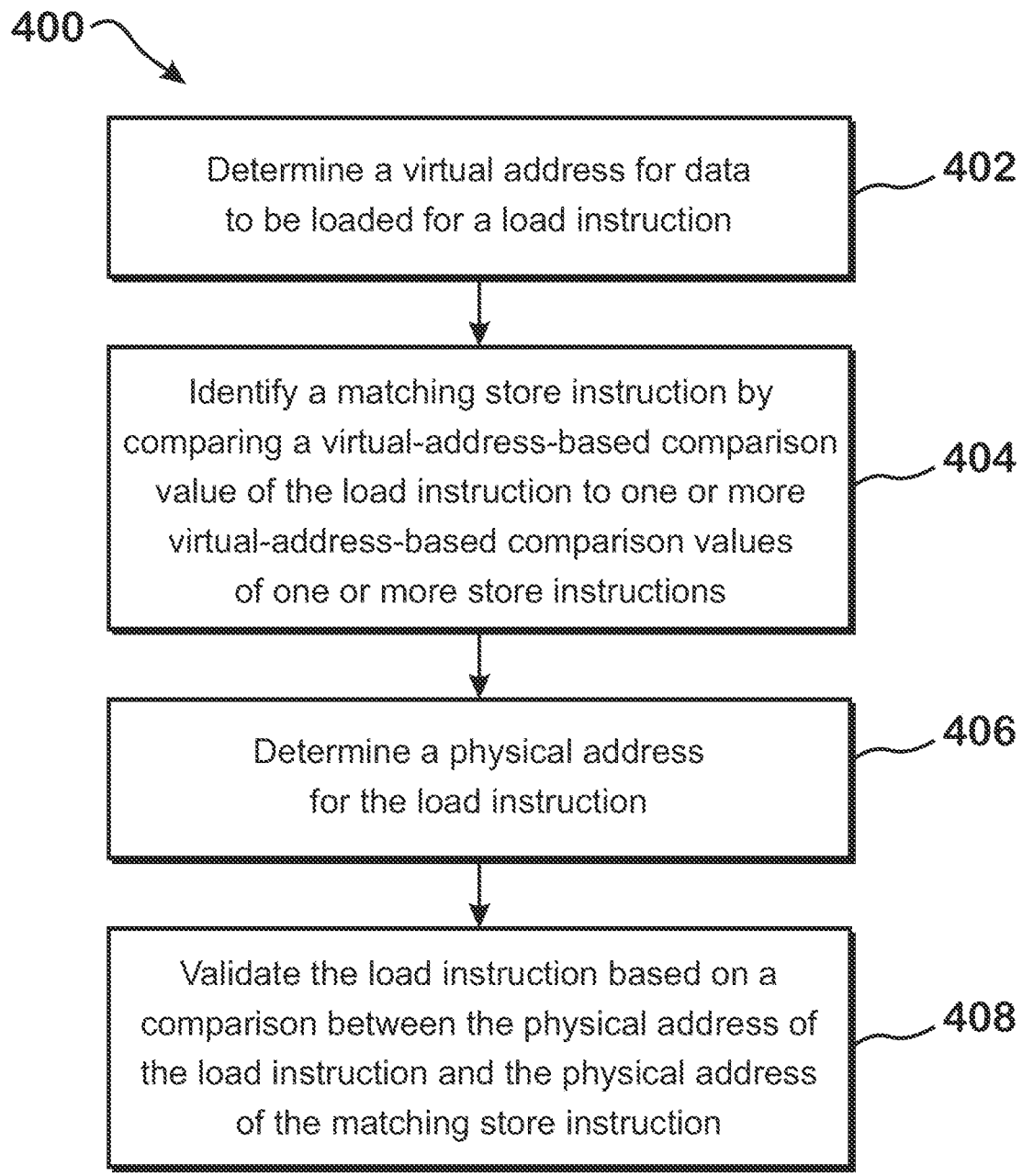
FIG. 4 is a flow diagram of a method for performing store-to-load forwarding for a load instruction, according to an example.

FIG. 4 is a flow diagram of a method 400 for performing store-to-load forwarding for a load instruction, according to an example. Although described with respect to the system of FIGS. 1-3B, those of skill in the art will understand that any system, configured to perform the steps of the method 400 in any technically feasible order falls within the scope of the present disclosure.

At step 402, the load/store unit determines a virtual address for data to be loaded for a load instruction. As described elsewhere herein, a load instruction specifies an address from which to load data. The address is often specified indirectly, such as based on an offset that is added to a base address, or in another manner. Step 402 involves performing whatever steps are necessary to determine the virtual address from the information specified by the load instruction.

At step 404, the load/store unit 214 identifies a matching store instruction by comparing a virtual-address-based comparison value of the load instruction to one or more virtual-address-based comparison values of one or more store instructions. The store instructions whose comparison values are compared are store instructions that have begun executing and have not yet committed their results to memory, as these are the store instructions that are available for comparison. After a store instruction has committed the store value to memory, that value is available directly in memory. In some implementations, the load/store unit 214 attempts to identify a matching store instruction from among the store instructions in the store queue 304 and the store commit queue 230, both of which are described elsewhere herein. Note that if no matching store instruction is found, then store-to-load forwarding is not performed and the method 400 ends.

At step 406, the load/store unit 214 determines a physical address for the load instruction via address translation. In various implementations, step 406 is performed in an at least partially overlapping time period with step 404. More specifically, in these implementations, the load/store unit 214 identifies the matching store without waiting for the physical address translation to be received, which results in a speed-up as compared with a technique in which the load/store unit 214 uses the physical address to perform store-to-load forwarding.

At step 408, the load/store unit 214 validates the load instruction based on a comparison of the physical address of the load instruction with the physical address of the matching store instruction. In some situations, the load instruction completes and the store instruction has not yet received a physical address. In these situations, the load/store unit 214 places the load instruction in the load waiting buffer 228. When the store instruction receives a physical address, the load/store unit 214 applies that physical address to the load instruction in the load waiting buffer 228 for validation. In other situations, the load instruction completes and the store instruction has received a physical address. In these situations, the load/store unit 214 compares the physical address of the load instruction with the physical address of the store instruction for validation. Regardless of whether the load waiting buffer 228 is used, if there is a match between physical addresses, then the load/store unit 214 successfully validates the load instruction and if there is no match between physical addresses, then the load/store unit 214 does not successfully validate the load instruction and the load/store unit 214 causes the load instruction to be flushed and replayed.

In some alternatives to the technique described above, the load instruction is allowed to execute and complete if the store instruction with the matching comparison value already has a translated physical address at the time that the load instruction is attempting to find a store instruction with a matching virtual address-based comparison value, but the load instruction fails to complete and is replayed if such a matching store instruction does not yet have a translated physical address.

It should be understood that many variations are possible based on the disclosure herein. Although features and elements are described above in particular combinations, each feature or element may be used alone without the other features and elements or in various combinations with or without other features and elements.

Various elements described herein are implemented as circuitry configured to perform the functionality described herein, as software executing on a processor, or as a combination thereof. In FIG. 1, the processor 102 is a computer processor configured to perform the operations described herein. The input driver 112, output driver 114, input devices 108, and output devices 110 are software executing on one or more processors, hardware, or a combination thereof. The various elements of the instruction pipeline 200 are hardware circuits.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing store-to-load forwarding for a load instruction, the method comprising:
    determining a virtual address for data to be loaded for the load instruction;
    identifying a matching store instruction from one or more store instruction memories by comparing a virtual-address-based comparison value for the load instruction to one or more virtual-address-based comparison values of one or more store instructions;
    placing the load instruction into a load waiting buffer in response to detecting that the matching store instruction has not yet received an address translation when initiating validation of the load instruction; and
    validating the load instruction based on a comparison between a physical address of the load instruction and a physical address of the matching store instruction.

2. The method of claim 1, wherein determining the virtual address for the data to be loaded for the load instruction comprises:
    performing one or more calculations on address values as specified by the load instruction to obtain the virtual address.

3. The method of claim 1, wherein the one or more store instruction memories includes at least one of:
    a store queue configured to store store instructions that are executing and have not yet retired; and
    a store commit queue configured to store store instructions that have retired and whose store data has not been committed to a memory system.

4. The method of claim 1, further comprising determining the physical address for the load instruction by performing an address translation to translate the virtual address for the data to be loaded for the load instruction to the physical address for the load instruction.

5. The method of claim 1, further comprising:
    in response to receiving a physical address for the store instruction, applying the physical address for the store instruction to the load waiting buffer to determine whether the physical address of the store instruction matches the physical address of the load instruction.

6. The method of claim 1, wherein validating the load instruction comprises:
    at time of initiation of the validating, detecting that the matching store instruction has received an address translation; and
    comparing the physical address of the load instruction to the physical address of the matching store instruction.

7. The method of claim 1, wherein the virtual-address-based comparison value for the load instruction based on the virtual address for the data for the load instruction comprises one of:
    a hash of a portion of the virtual address for the load instruction;
    a hash of the full virtual address for the load instruction;
    a portion of the virtual address for the load instruction; and
    the full virtual address for the load instruction.

8. The method of claim 1, further comprising:
    in response to successfully validating the load instruction, allowing the load instruction to complete execution without flushing the load instruction; or
    in response to unsuccessfully validating the load instruction, flushing the load instruction and replaying the load instruction.

9. A load/store subsystem for performing store-to-load forwarding for a load instruction, the load/store subsystem comprising:
    one or more store instruction memories; and
    a load/store unit configured to:
        determine a virtual address for data to be loaded for the load instruction;
        identify a matching store instruction from the one or more store instruction memories by comparing a virtual-address-based comparison value for the load instruction to one or more virtual-address-based comparison values of one or more store instructions;
        place the load instruction into a load waiting buffer in response to detecting that the matching store instruction has not yet received an address translation when initiating validation of the load instruction; and
        validate the load instruction based on a comparison between the physical address of the load instruction and a physical address of the matching store instruction.

10. The load/store subsystem of claim 9, wherein determining the virtual address for the data to be loaded for the load instruction comprises:
    performing one or more calculations on address values as specified by the load instruction to obtain the virtual address.

11. The load/store subsystem of claim 9, wherein the one or more store instruction memories includes at least one of:
    a store queue configured to store store instructions that are executing and have not yet retired; and
    a store commit queue configured to store store instructions that have retired and whose store data has not been committed to a memory system.

12. The load/store subsystem of claim 9, wherein the load/store unit is further configured to determine the physical address for the load instruction by performing an address translation to translate the virtual address for the data to be loaded for the load instruction to the physical address for the load instruction.

13. The load/store subsystem of claim 9, wherein the load/store unit is further configured to:

in response to receiving a physical address for the store instruction, apply the physical address for the store instruction to the load waiting buffer to determine whether the physical address of the store instruction matches the physical address of the load instruction.

14. The load/store subsystem of claim 9, wherein validating the load instruction comprises:
at time of initiation of the validating, detecting that the matching store instruction has received an address translation; and
comparing the physical address of the load instruction to the physical address of the matching store instruction.

15. The load/store subsystem of claim 9, wherein the virtual-address-based comparison value for the load instruction based on the virtual address for the data for the load instruction comprises one of:
a hash of a portion of the virtual address for the load instruction;
a hash of the full virtual address for the load instruction;
a portion of the virtual address for the load instruction; and
the full virtual address for the load instruction.

16. The load/store subsystem of claim 9, wherein the load/store unit is further configured to:
in response to successfully validating the load instruction, allowing the load instruction to complete execution without flushing the load instruction; or
in response to unsuccessfully validating the load instruction, flushing the load instruction and replaying the load instruction.

17. A processing unit for performing store-to-load forwarding for a load instruction, the processing unit comprising:
one or more store instruction memories;
a load/store unit configured to:
determine a virtual address for data to be loaded for the load instruction;
identify a matching store instruction from the one or more store instruction memories by comparing a virtual-address-based comparison value for the load instruction to one or more virtual-address-based comparison values of one or more store instructions;
place the load instruction into a load waiting buffer in response to detecting that the matching store instruction has not yet received an address translation when initiating validation of the load instruction; and
validate the load instruction based on a comparison between the physical address of the load instruction and a physical address of the matching store instruction; and
a data translation lookaside buffer configured to translate the virtual address for the load instruction to the physical address for the load instruction.

18. The processing unit of claim 17, wherein determining the virtual address for the data to be loaded for the load instruction comprises:
performing one or more calculations on address values as specified by the load instruction to obtain the virtual address.

19. The processing unit of claim 17, wherein the one or more store instruction memories includes at least one of:
a store queue configured to store store instructions that are executing and have not yet retired; and
a store commit queue configured to store store instructions that have retired and whose store data has not been committed to a memory system.

20. The processing unit of claim 17, further comprising determining the physical address for the load instruction by performing an address translation to translate the virtual address for the data to be loaded for the load instruction to the physical address for the load instruction.

* * * * *